(12) United States Patent
Bushner

(10) Patent No.: US 7,526,245 B2
(45) Date of Patent: Apr. 28, 2009

(54) METHOD AND SYSTEM FOR SINGLE CHIP SATELLITE SET-TOP BOX SYSTEM

(75) Inventor: Paige Bushner, San Juan Capistrano, CA (US)

(73) Assignee: Broadcom Corporation, Irvine, CA (US)

( * ) Notice: Subject to any disclaimer, the term of this patent is extended or adjusted under 35 U.S.C. 154(b) by 880 days.

(21) Appl. No.: 10/716,065

(22) Filed: Nov. 18, 2003

(65) Prior Publication Data

US 2005/0009481 A1    Jan. 13, 2005

Related U.S. Application Data

(60) Provisional application No. 60/486,797, filed on Jul. 11, 2003.

(51) Int. Cl.
*H04H 20/74* (2008.01)
(52) U.S. Cl. ............... 455/3.02; 455/133; 455/333; 342/357.12; 701/215
(58) Field of Classification Search ............ 455/3.02, 455/410, 411, 75, 76, 550.1, 552.1, 553.1, 455/557, 558, 132, 101, 133, 137, 313, 314, 455/323, 324, 333; 342/357.01, 357.06, 342/357.12; 701/213, 214, 215
See application file for complete search history.

(56) References Cited

U.S. PATENT DOCUMENTS

| | | | |
|---|---|---|---|
| 5,384,847 A * | 1/1995 | Hendrickson et al. ....... 380/247 |
| 6,256,493 B1 * | 7/2001 | Dorenbosch et al. ........ 455/419 |
| 6,445,907 B1 * | 9/2002 | Middeke et al. .......... 455/226.1 |
| 7,123,875 B1 * | 10/2006 | Marko et al. ............... 455/3.02 |
| 7,130,576 B1 * | 10/2006 | Gurantz et al. ............. 455/3.02 |
| 7,233,781 B2 * | 6/2007 | Hunter et al. ............. 455/404.1 |
| 2001/0024962 A1 * | 9/2001 | Bauer ......................... 455/556 |
| 2002/0059651 A1 * | 5/2002 | Hirata et al. ................. 725/153 |
| 2002/0167405 A1 * | 11/2002 | Shanks et al. ............. 340/572.1 |
| 2003/0203743 A1 * | 10/2003 | Sugar et al. .............. 455/550.1 |
| 2004/0088111 A1 * | 5/2004 | Ahlbrecht et al. ........... 701/213 |

* cited by examiner

*Primary Examiner*—Nhan T Le
(74) *Attorney, Agent, or Firm*—McAndrews, Held & Malloy, Ltd.

(57) ABSTRACT

Certain embodiments of the invention may be found in an single chip satellite set-top box solution that comprises demodulation, decoding and audio/video display functions integrated within a single chip. The single chip solution for the satellite set-top box is adapted to provide demodulation, display, and other related set-top box functions for a system that may be adapted to handle two incoming data streams modulated using an 8 PSK, 8 PSK-turbo or QPSK scheme, for example. Accordingly, the single chip satellite set-top box solution comprise dual 8 PSK/8 PSK-turbo/QPSK demodulators, a MIPS CPU, a 16-bit DDR-SDRAM, graphics display capability for handling two channels, and audio/video decoders and DACs for handling two incoming channels. The single chip satellite set-top box solution may also comprise integrated peripheral support for major set top box functions including a smart card interface, IR receivers, and general purpose input/output (GP/IO) pins.

34 Claims, 4 Drawing Sheets

METHOD AND SYSTEM FOR SINGLE CHIP SATELLITE SET-TOP BOX SYSTEM

CROSS-REFERENCE TO RELATED APPLICATIONS/INCORPORATION BY REFERENCE

This application makes reference to, claim priority to, and claims the benefit of:
U.S. patent application Ser. No. 10/141,197 filed on May 8, 2002;
U.S. patent application Ser. No. 10/141,599 filed on May 8, 2002;
U.S. patent application Ser. No. 10/141,549 filed on May 8, 2002; and
U.S. Application Ser. No. 60/486,797 filed on Jul. 11, 2003.

The above stated applications are hereby incorporated herein by reference in their entirety.

FIELD OF THE INVENTION

Certain embodiments of the invention relate to set-top boxes utilized for satellite communication. More specifically, certain embodiments of the invention relate to a method and system for a single chip satellite set-top box (STB) system.

BACKGROUND OF THE INVENTION

In satellite systems that are utilized to broadcast media programs or content, a set-top box (STB) coupled to a terrestrial satellite dish is utilized to receive and process signals for display or playback on a television screen, for example. These satellite set-top boxes (STBs) employ a multi-chip solution to provide functions such as demodulation, encoding, decoding, display, and other related functions. For example, two BCM4500 chips manufactured by Broadcom Corporation of Irvine Calif. are utilized for demodulation and one BCM7319 chip also manufactured by Broadcom Corporation of Irvine Calif. is utilized to handle all display and other set-top-box functions. This multi-chip solution utilizes a significant amount of printed circuit board space, consumes a considerable amount of power, and is very costly to implement. With regard to the two chips that are utilized for demodulation, a first chip demodulates a first incoming data stream and the second chip demodulates a second incoming data stream.

FIG. 1 is a high level block diagram 100 of an exemplary conventional set-top box 102. Referring to FIG. 1, the set-top box 102 may comprise a storage block 104, a single receiver or demodulator block 106, a memory block 108, a conditional access (CA) system 110, an external interface block 112, an audio processor block 114, a video display engine block 116, and MPEG decoder block 118, a processor block 120, an application block 122 and an operating system block 124. The operating system block may be an embedded operating system such as pSOS, VxWorks, embedded Linux or Nucleus. The single receiver or demodulator block 106, memory block 108, external interface block 112, audio processor block 114, video display engine block 116 and MPEG encoder/decoder block 118 may each comprise a plurality of chips or chip sets. The conditional access system 110 may also include a plurality of chips. Accordingly, each of these chips or chip sets consume valuable printed circuit board (PCB) real estate resulting in increased cost. The plurality of chips also results in increased power consumption.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the invention may be found in an single chip satellite set-top box solution that comprises functions such as demodulation, decoding and audio/video display functions. The single chip solution for the satellite set-top box market provides demodulation, display, and other related set-top box functions for a system including two incoming data streams modulated using an 8 PSK/8 PSK-turbo/QPSK modulation schemes. The single chip satellite set-top box solution may also comprise dual 8 PSK, 8 PSK-turbo, QPSK demodulators, a CPU, a 16-bit DDR-SDRAM, graphics display capability for handling two channels, and audio/video decoders and DACs for handling two channels. The single chip satellite set-top box solution may also comprise integrated peripheral support for major set top box functions including a smart card interface, IR receivers, and general purpose input/output (GPI/O) pins.

Certain embodiments of the invention may be found in a system for an integrated set-top box. The integrated set-top box may comprise a single integrated circuit chip, which may include a first satellite receiver demodulator integrated within the single integrated circuit chip and at least a second satellite receiver demodulator integrated within the single integrated circuit chip. At least one processor integrated within the single integrated circuit chip may be coupled to the first satellite receiver demodulator and/or the second satellite receiver demodulator. The processor may comprise a MIPS processor, a floating point processor/coprocessor and at least one data transport processor. A programmable memory may also be integrated within the single integrated circuit chip and may be utilized to store security information and/or configuration information for the single integrated circuit chip. The security information may comprise security keys and a device identifier (ID), where the device identifier may comprise an electronic serial number and/or an address. The configuration information may comprise configuration data and/or code for configuring the single integrated circuit chip. The programmable memory may be a one-time programmable memory, although the invention may not be so limited.

The integrated set-top box may further comprise at least one video decoder integrated within the single integrated circuit chip, which may be coupled to at least one of the processors. The video decoder may be a standard definition (SD) MPEG-2 video decoder. At least one video and graphics display engine may be integrated within the single integrated circuit chip and coupled to the video decoder. At least one video encoder may be integrated within the single integrated circuit chip and coupled to video and graphics display engine. In another aspect of the invention, at least one video digital-to-analog converter and RF modulator may be integrated within the single integrated circuit chip and coupled to the video encoder. At least one audio decoder, for example, an MPEG-2 audio decoder may also be integrated within the single integrated circuit chip.

At least one audio digital-to-analog converter may be embedded within the single integrated circuit chip and coupled to the audio decoder. Furthermore, at least one memory controller, for example, a unified dual data rate DRAM memory controller (DDR-DRAM), may be integrated within the single integrated circuit chip and coupled to at least one of the processors. A standardized digital satellite equipment control (DiSEqC) bus may also be integrated within the single integrated circuit chip. A plurality of peripheral interfaces may be integrated within the single integrated circuit chip and may comprise an infrared interface, a universal asynchronous receiver/transmitter, a serial peripheral interface, a binary synchronous communication interface, general purpose input/output pins, and pulse width modulation controller interface. One or more read-only memory (ROM) may also be integrated within the single integrated circuit and may comprise a CPU boot ROM and a FLASH.

At least one debug port may be integrated within the single integrated circuit chip and may comprise a JTAG port or any variation thereof, for example, EJTAG. One or more card reader and/or writer interfaces, for example, a smart card reader and/or writer may be integrated within the single integrated circuit chip. One or more, core voltage regulators, phase lock loops and telephony modems may be integrated within the single integrated circuit chip. The first satellite receiver demodulator and the second satellite receiver demodulator may be 8 PSK, 8 PSK-turbo and/or QPSK demodulators, for example.

Other aspects of the invention may be found in a method for processing information in a set-top box. The method may comprise receiving a first modulated signal by a first satellite receiver within a single integrated circuit chip and demodulating the first modulated signal by the first satellite receiver within the single integrated circuit chip to generate a first demodulated signal. A second modulated signal may also be received by a second satellite receiver within the single integrated circuit chip and the second modulated signal may be demodulated by the second satellite receiver within the single integrated circuit chip to generate a second demodulated signal. The demodulation of the first modulated signal and the demodulation of the second modulated signal may occur simultaneously within the single integrated circuit chip.

A video portion of the first demodulated signal may be decoded within the single integrated circuit chip to generate a first decoded video signal. The first decoded video signal may be encoded within the single integrated circuit chip to generate a first encoded digital video signal. The first encoded digital video signal may be converted within the single integrated circuit chip, to a first digital-to-analog video signal. An audio portion of the first demodulated signal may be decoded within the single integrated circuit chip, to generate a first decoded digital audio signal. The first decoded digital audio signal may be converted within the single integrated circuit chip, to a first analog audio signal.

A video portion of the second demodulated signal may be decoded within the single integrated circuit chip to generate a second decoded video signal. The second decoded video signal may be encoded within the single integrated circuit chip, to generate a second encoded digital video signal. The second encoded digital video signal may be converted within the single integrated circuit chip, to a second digital-to-analog video signal. An audio portion of the second demodulated signal may be decoded within the single integrated circuit chip, to generate a second decoded digital audio signal. The second decoded digital audio signal may be converted within the single integrated circuit chip to a second analog audio signal.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a single chip satellite set-top box solution. The single chip satellite set-top box comprise demodulation, decoding and audio/video display functions all integrated in a single chip. The single chip solution for the satellite set-top box may be adapted to provide demodulation, display, and other related set-top box functions for a system that may be adapted to handle two incoming data streams modulated using an 8 PSK, 8 PSK-turbo or QPSK modulation schemes, for example. Accordingly, the single chip satellite set-top box solution may comprise dual 8 PSK/8 PSK-turbo/QPSK demodulators, a MIPS CPU, a 16-bit DDR-SDRAM, graphics display capability for handling two channels, and audio/video decoders and DACs for handling two incoming channels. The single chip satellite set-top box solution may also comprise integrated peripheral support for major set top box functions including, but not limited to, a smart card interface, IR receivers, and general purpose input/output (GP/IO). The ability to provide a single CPU to register interface for each of the demodulators in the single chip satellite set-top box provides great flexibility in reducing interface logic and integration of what would otherwise be individualized processing functions.

Figure 1:
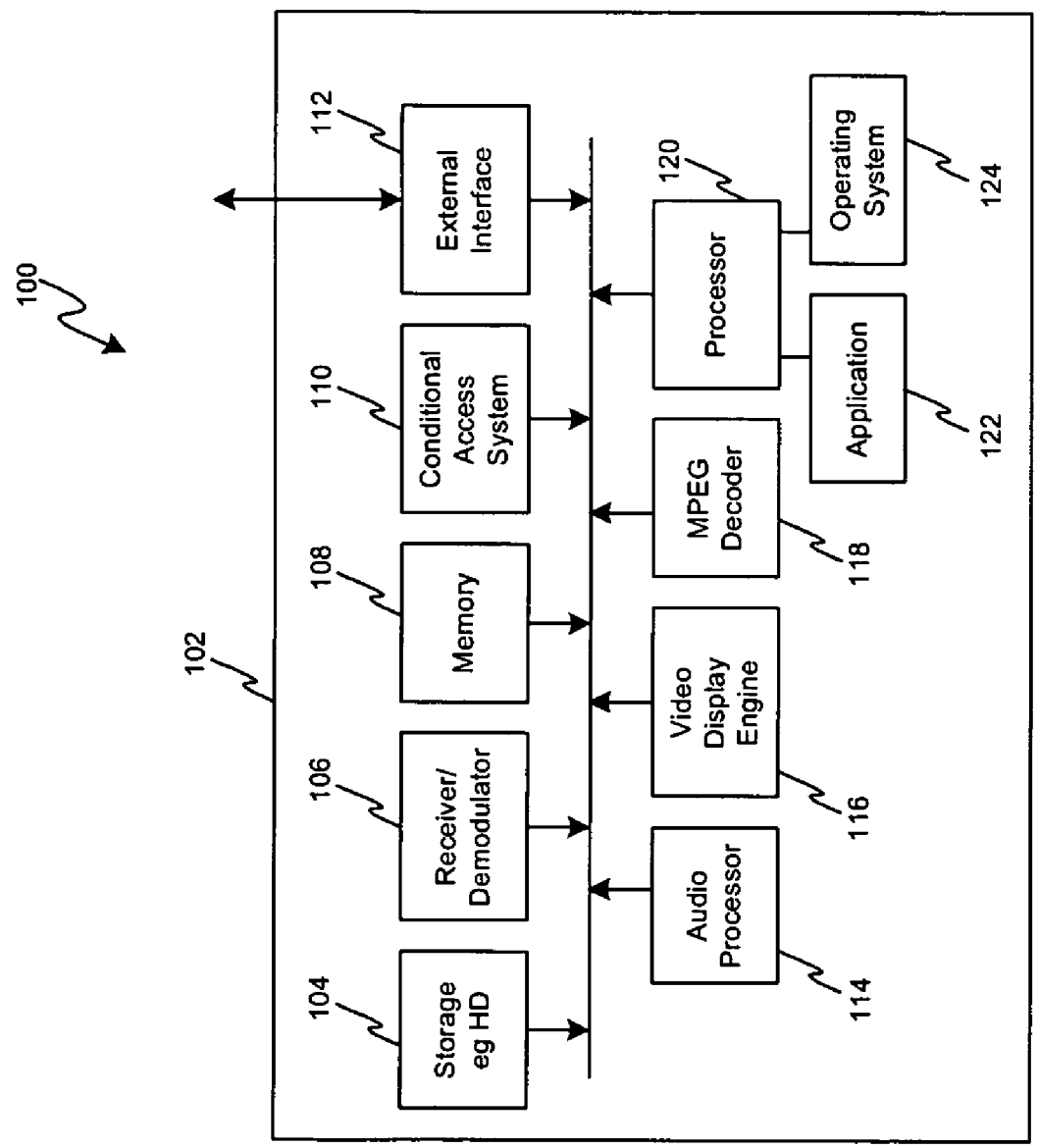
FIG. 1 is a high level block diagram of an exemplary conventional set-top box.
Figure 2:
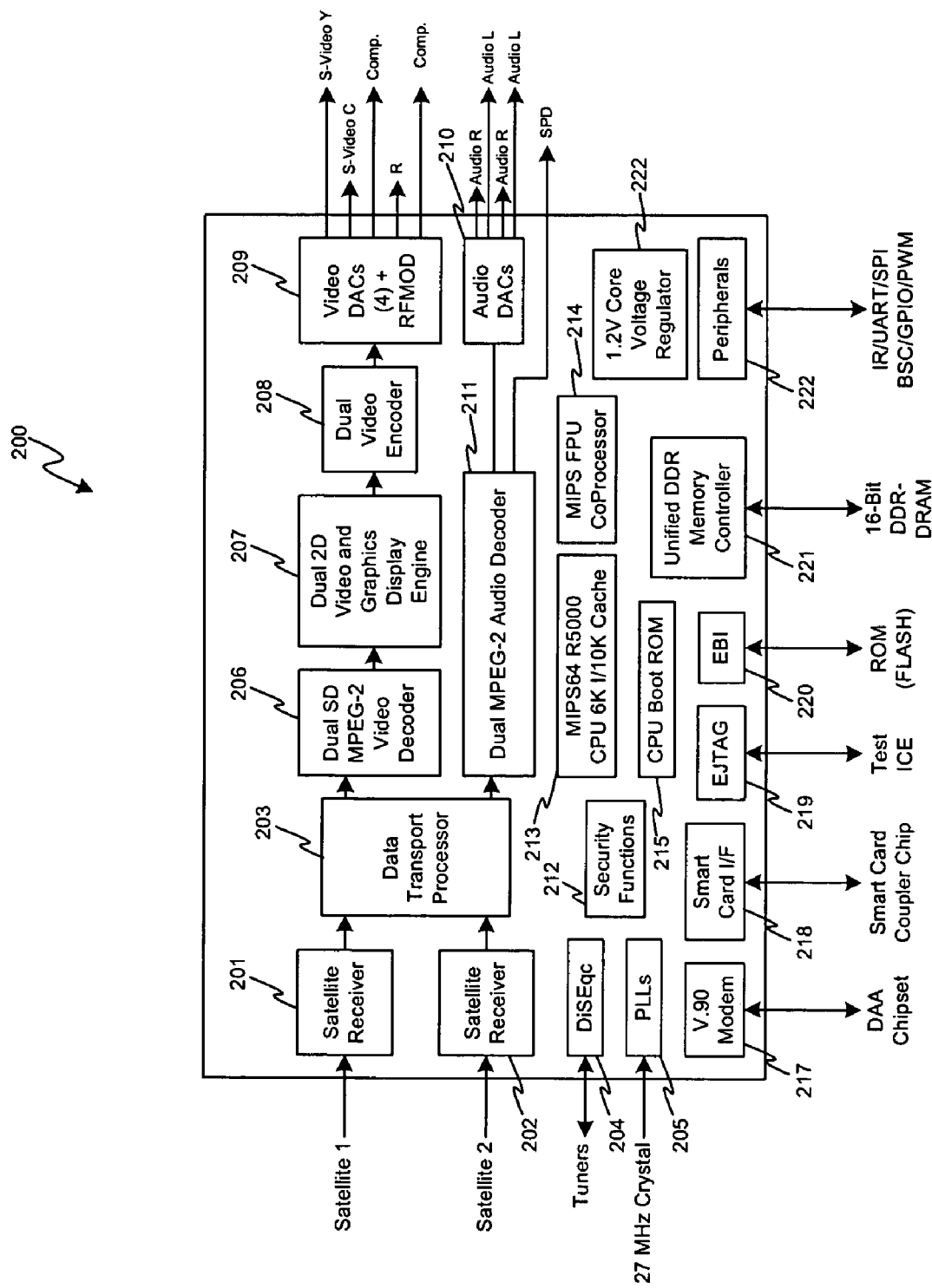
FIG. 2 is a block diagram illustrating an embodiment of a singe chip satellite set top box system, in accordance with various aspects of the present invention.

FIG. 2 is a block diagram illustrating an embodiment of a singe chip satellite set top box system 200, in accordance with various aspects of the present invention. The single chip satellite set-top box system 200 comprises a single integrated circuit chip, having integrated therein, a first satellite receiver or demodulator 201, a second satellite receiver or demodulator 202, a data transport processor 203, a digital satellite equipment control (DiSeqC) 104, phase locked loops (PLLs) 205, a dual standard definition (SD) MPEG-2 video decoder 206, a dual 2D video and graphics display engine 207, a dual video encoder 208, and video digital-to-analog converters (DACs) and RF modulator (RFMOD) 209. The single chip satellite set-top box system 200 may also comprise, integrated therein, audio DACs 210, a dual MPEG-2 audio decoder 211, security functions 212, a MIPS64 R5000 central processing unit (CPU) and cache 213, a MIPS floating point unit (FPU) co-processor 214, a CPU boot read only memory (ROM) 215, a 1.2V core voltage regulator 216 and a V.90 modem 217. Also integrated within the single chip satellite set-top box system 200 is a smart card interface (I/F) 218, an EJTAG port 219, an external bus interface (EBI) 220, a unified dual data rate dynamic random access memory (DDR-DRAM) memory controller 221, and peripherals 222.

The dual digital satellite receivers 201, 202 may be configured to simultaneously accept two modulated data streams at rates of about 90 Mbps. However, the various aspects of the invention are not limited in this regard. Accordingly, the dual digital satellite receivers 201, 202, also referred to as demodulators, may independently demodulate, and each delivers demodulated, error-corrected output data streams. Each of receivers or demodulators 201, 202 may comprise dual 8-bit analog-to-digital (A/D) converters, an all-digital variable rate 8 phase shift keying (PSK), turbo PSK, quaternary phase shift keying (QPSK) and offset QPSK receiver. Each of the receivers or demodulators 201, 202 may comprise a digital video broadcast (DVB), DirecTV, or Digicipher II compliant forward error correction (FEC) decoder, and any required random access memory (RAM).

From a spectral point of view, phase-shift keying (PSK), also known as digital phase modulation, is somewhat similar to frequency modulation (FM). However, PSK changes the phase of a transmitted waveform instead of its frequency. After PSK modulating a signal, the resultant finite phase changes represent digital information. A phase-modulated waveform may be generated using digital data to switch between two signals having the same frequency but opposite phase. Upon reception, when the resultant waveform is multiplied by a sine wave of the same frequency, a cosine waveform results that may be double the received frequency. This may result in a frequency-independent signal whose amplitude may be proportional to the cosine of the phase shift. The higher-frequency signal may be filtered out in order to generate the original modulating data prior to transmission.

A transmitted carrier signal may undergo a plurality of phase changes, and multiplying the corresponding received signal by a sine wave of the same frequency demodulates the phase shifts into voltage levels that are independent of carrier frequency. For example, with QPSK, the carrier experiences four changes in phase or four symbols and may represent two binary bits of information for each symbol. Therefore, the QPSK modulation scheme permits the transmission of two bits of data instead of one, effectively doubling the bandwidth of the carrier signal. In a somewhat similar manner, higher order modulation schemes, for example, 8 PSK, increases information throughput for a given bandwidth approximately in proportion to the number of bits for each symbol. Accordingly, the number of bits per symbol increase from two for QPSK, to three for 8 PSK and to four for 16 QAM.

Reed Solomon coding and Trellis coding may also be utilized to provide error correction. Two types of turbo codes are parallel concatenated convolutional codes or double binary circular recursive systematic convolutional codes (CRSC) and block turbo codes. Turbo codes enable increased throughput without necessarily requiring a larger satellite antenna and may allow performance to within about 0.5 dB of Shannon's theoretical limit. These coding techniques may also be utilized to minimize interference effects such as intersymbol interference (ISI).

The data transport processor 203 operationally interfaces to the satellite receivers 201, 202 and comprises an MPEG-2/DirecTV transport stream message/packetized elementary stream (PES) parser and demultiplexer. The data transport processor 203 may simultaneously process 64 protocol identifiers (PIDs) in up to two independent transport streams, with decryption for all 64 PIDs. The data transport processor 203 supports message/PES parsing for 64 PIDs with storage to 64 external dynamic random access memory buffers, and provides 64 section filters. An elementary stream (ES) is a general term for a coded bitstream such as audio or video. Elementary streams comprise groups of packets. A packetized elementary stream may be a low-level stream of MPEG packets comprising an elementary stream such as audio or video.

The dual SD MPEG-2 video decoder 106 may operationally interface with the data transport processor 203 and decodes standard definition video streams and optionally accepts transport such as ATSC-MPEG/DirecTV, PES, or elementary stream (ES) streams and may self-sufficiently perform any of the requisite decoding functions to render decoded video in 4:2:2 format, for example The 2D video and graphics display engine 207 may be adapted to operationally interface to the dual standard definition MPEG-2 video decoder 106 and accepts decoded MPEG and performs professional quality compositing of text and graphics with video. The 4:2:2 video format may comprise a component digital video format with a ratio of sampling frequencies used to digitize the luminance and color difference components of a video signal (Y, R-Y, B-Y). The term 4:2:2 means that, for every four samples of Y, there are two samples each of R-Y and B-Y, yielding more chrominance bandwidth in relation to luminance.

The dual MPEG-2 audio decoder 211 may operationally interface with the dual transport processor 203 and the audio DACs 210. The dual MPEG-2 audio decoder 211 and the audio DACs 210 may convert compressed audio data to uncompressed pulse code modulation (PCM) audio data from either live or stored sources. Data from the stored sources may subsequently be played back for viewing or listening. The final mixed audio may be output either digitally over a Sony/Philips Digital Interface (SPDIF) interface or in analog mode through a two-channel audio DAC. The SPDIF interface is a standard audio transfer file format and allows the transfer of audio from one file to another without conversion to and from an analog format.

The dual video encoder 208 may operationally interface with the dual 2D video and graphics display engine 207 and the video DACs and RFMOD or RF channel 3/4 modulator 209. The dual video encoder 208 and the video DACs and RFMOD or RF channel 3/4 modulator 209 may be configured to provide National Television Standards Committee (NTSC), Phase Alternate Line (PAL) or Systeme Electronique Couleur Avec Memoire (SECAM) video encoding and produce the final composite S-video and channel 3/4 outputs. In instances when color and brightness are not separated in a video signal, for example when the signals are combined, a composite video signal results. S-video has separate channels for color and brightness resulting in Y/C signals where Y represents brightness and C represents color.

The processor capability may comprise a MIPS64 R5000 class microprocessor subsystem 213 with memory management unit (MMU), a floating point unit 214, 16 KB instruction cache, and 16 KB data cache with bridging to memory and a local bus where external peripherals may be attached. The CPU boot read-only memory (ROM) 215 provides on-chip startup code.

The security functions block 212 comprises a one-time programmable memory and encryption/decryption hardware for storing and managing conditional access keys. The V.90 modem 217 provides a complete V.90 modem interface. The smart card I/F 218 provides, for example, an Europay, MasterCard, and Visa (EMV) and International Organization for Standardization (ISO) compliant interface to an external smart card. The Enhanced Joint Test Action Group (EJTAG) port 219 is a test port that supports software debugging. The phase lock loops 105 may be configured to provide DDR-DRAM, CPU, and all other internal clocks from a single 27 MHz external reference crystal. The unified dual data rate dynamic random access memory controller 221 provide access to external DDR-DRAM memory and all arbitration functions.

In accordance with an embodiment of the invention, the single security functions block 212 is adapted to handle security functions and conditional access functions for both demodulated channels produced by the demodulators/receivers 201, 202. Since the security functions block 212 may have access to both interfaces of the demodulators/receivers 201, 202, then only a single smart card interface or smart card chip may be required for handling security and conditional access (CA) functions. Furthermore, the integrated interface for handling each of the demodulators/receivers 201, 202 permits a single one-time programmable memory and encryption/decryption processing block to be utilized for handling both channels. In general, the implementation of FIG. 2 provides a flexible solution that may further permit the security functions block 212 to be easily adapted to handle a plurality of channels from a plurality of demodulators/receivers.

The digital satellite equipment control bus (DiSEqC) 204 is a standardized communication bus that facilitates communication between satellite receivers and satellite peripheral equipment. The digital satellite equipment control bus (DiSEqC) 204 utilizes existing coaxial cable and may be adapted to enable switching in a multi-satellite environment. Accordingly, this eliminates any switching problems that may otherwise arise due to system incompatibility. The digital satellite equipment control bus (DiSEqC) 204 may also provide master transmit/receive for a low noise block down-converter (LNB) slave control. A low noise block down-converter amplifies received signals and converts the amplified received signals from microwaves to lower frequency signals that may then be sent along a cable to a satellite receiver. The low noise block down-converter may be either single or double. A double low noise block down-converter may be utilized when more than one receiver is used. To accommodate more channels into a given bandwidth, channels may be transmitted utilizing vertical or horizontal polarization.

In general, a digital satellite equipment control bus relies on a switching box that detects a 22 KHz tone pulsing quickly on and off in order to control multiple LNBs via a DiSEqC switching box. DiSEqC messages may be sent as sequences of short bursts at 22 KHz modulated on the LNB power supply carried via the coax cable from the LNB input on the receiver (master). The messages include digital bytes of eight bits per byte. Each bit occupies a specific time and the proportion of that time filled with the 22 KHz burst determines if that bit is a zero or a one.

The peripherals 222 include universal asynchronous receiver/transmitter (UARTs), pulse width modulation (PWM) controllers, counter/timers, general purpose inputs/outputs (GPI/Os), infrared (IR) blaster and IR receivers. The voltage regulator 216 provides tight tolerance 1.2V for powering the core of the single chip system 200.

An aspect of the invention may be found in a method for processing information in a set-top box. With reference to FIG. 2, the method may comprise receiving a first modulated signal by a first satellite receiver 201 within a single integrated circuit chip 200 and demodulating the first modulated signal by the first satellite receiver 201 within the single integrated circuit chip 200 to generate a first demodulated signal. A second modulated signal may also be received by a second satellite receiver 200 within the single integrated circuit chip 200 and the second modulated signal may be demodulated by the second satellite receiver 200 within the single integrated circuit chip 200 to generate a second demodulated signal. The demodulation of first modulated signal and the demodulation of second modulated signal may occur simultaneously within the single integrated circuit chip 200.

A video portion of the first demodulated signal may be decoded by the video decoder 206 within the single integrated circuit chip 200 to generate a first decoded video signal. The video portion of the first demodulated signal may be received from the data transport processor 203. The first decoded video signal may be encoded by the video encoder 208 after being processed by the video display engine 207, to generate a first encoded digital video signal. The first encoded digital video signal may be converted by video DACs 209 within the single integrated circuit chip 200, to a first digital-to-analog video signal.

An audio portion of the first demodulated signal may be decoded by the audio encoder 211 within the single integrated circuit chip 200, to generate a first decoded digital audio signal. The audio portion of the first demodulated signal may be received from the data transport processor 203. The first decoded digital audio signal may be converted within the single integrated circuit chip, to a first analog audio signal.

A video portion of the second demodulated signal may be decoded by the video decoder 206 within the single integrated circuit chip 200 to generate a second decoded video signal. The video portion of the second demodulated signal may be received from the data transport processor 203. The second decoded video signal may be encoded by the video encoder 208 after being processed by the video display engine 207, to generate a second encoded digital video signal. The second encoded digital video signal may be converted by the video DAC 209 within the single integrated circuit chip 200, to a second digital-to-analog video signal.

An audio portion of the second demodulated signal may be decoded by the audio decoder 211 within the single integrated circuit chip 200, to generate a second decoded digital audio signal. The audio portion of the second demodulated signal may be received from the data transport processor 203. The second decoded digital audio signal may then be converted by the audio DAC 210 within the single integrated circuit chip 200 to a second analog audio signal.

Figure 3:
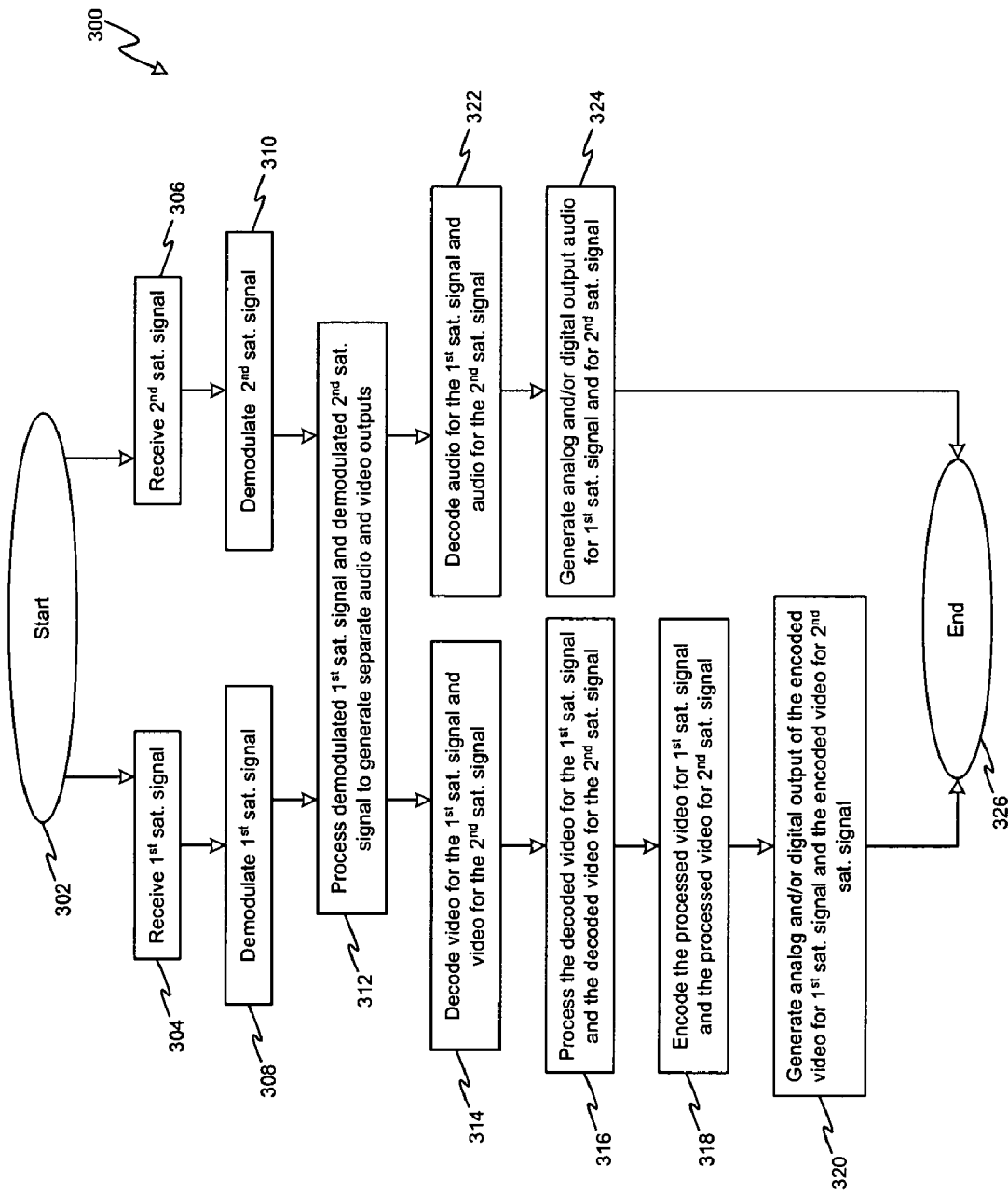
FIG. 3 is a flowchart illustrating exemplary steps that may be utilized for demodulating two received satellite signals in accordance with an embodiment of the invention.

FIG. 3 is a flowchart 300 illustrating exemplary steps that may be utilized for demodulating two received satellite signals in accordance with an embodiment of the invention. Referring to FIG. 3, the exemplary steps may start with step 302. In step 304, a first satellite signal is received and in step 308, a second satellite signal is received. In step 308, the first satellite signal is demodulated and in step 310 the second satellite signal is demodulated. In step 314, the demodulated first satellite signal and the demodulated second satellite signals are commonly processed in order to generate separate audio and video outputs.

In step 314, the video signals for the first satellite signal and the second satellite signal are decoded. In step 316, the decoded video for the first satellite signal and the second satellite signal are processed or formatted. In step 318, the processed first satellite signal and the processed second satellite signal are encoded. In step 320, an analog and/or digital output of the encoded first satellite signal and the encoded second satellite signal are produced.

Subsequent to step 312, step 322 may also be executed. In this regard, in step 322, audio for the first satellite signal and the second satellite signal may be decoded. In step 324, an analog and/or digital representation of the decoded audio output for the first satellite signal and the second satellite signal may be generated. Following steps 320 and step 324, the exemplary steps may end with step 326. Although the exemplary steps in the flowchart 300 illustrate the reception and processing of two satellite signals, the invention is not limited in this regard. Accordingly, any of the satellite demodulators/receivers 201, 202 may process a received signal without the other demodulator/receiver also processing a received signal.

The single chip set-top box provides satellite set-top box functionality including demodulation and display functions for simultaneously processing at least incoming satellite signals. Accordingly, the single integrated circuit chip 200 utilizes less printed circuit board real estate when compared to conventional multi-chip solutions. The single integrated set top box solution also provides reduction in chip-to-chip routing and power/clock routing and a reduction in manufacturing cost due to reduced chip packaging costs and reduced die area when compared to conventional multi-chip solutions. The single integrated set top box solution may also consume less power due to the integration of receiver technology into a much smaller transistor geometry, fewer pads and a reduction of chip-to-chip interface logic.

In accordance with an embodiment of the invention, a reduction in chip-to-chip interface logic is achieved, for example, by utilizing a single data transport processor 203 rather than separate data transport processors coupled to each of the satellite demodulators/receivers 201, 202. In this regard, the single data transport processor 203 may be adapted to process the demodulated signals from each of the demodulators/receivers 201, 202 and provide separate output audio and video signals for each of the signals produced by the demodulators 201, 202. Reduction in chip-to-chip interface logic is therefore achieved at the output of the single data transport processor 203 where a reduced number of output pins are required to handle separate audio and video signals for each of the demodulated satellite signals produced by the demodulators/receivers 201, 202. The use of a single register interface for handling the functions of the demodulators/receivers 201, 202 significantly reduces chip-to-chip interface logic and internal processing functions.

Furthermore, the separate processing of the audio and the video for each of the demodulated signals produced by the demodulators/receivers 201, 202 reduces chip count and interface logic since dual channel processing chips may be utilized. For example, a dual standard definition MPEG-2 video decoder 203 may be utilized for video decoding video signals corresponding to each of the demodulated signals produced by the demodulators/receivers 201, 202. The dual 2D video and graphics display engine 207, dual video encoder 208 and dual MPEG-2 audio decoder also reduces chip count and interface logic by integrating processing for dual channels within a single chip.

In another aspect of the invention, the implementation of FIG. 2 eliminates a need for separate CPU to register interfaces for each of the demodulators/receivers 201, 202. In this regard, instead of having a first CPU to register interface for the first demodulator/receiver 201 and a second a CPU to register interface for the second demodulator/receiver 202, the integrated demodulators/receivers 201, 202 utilizes a single a CPU to register interface. This further reduces the chip count, the interface logic and cost.

Figure 4:
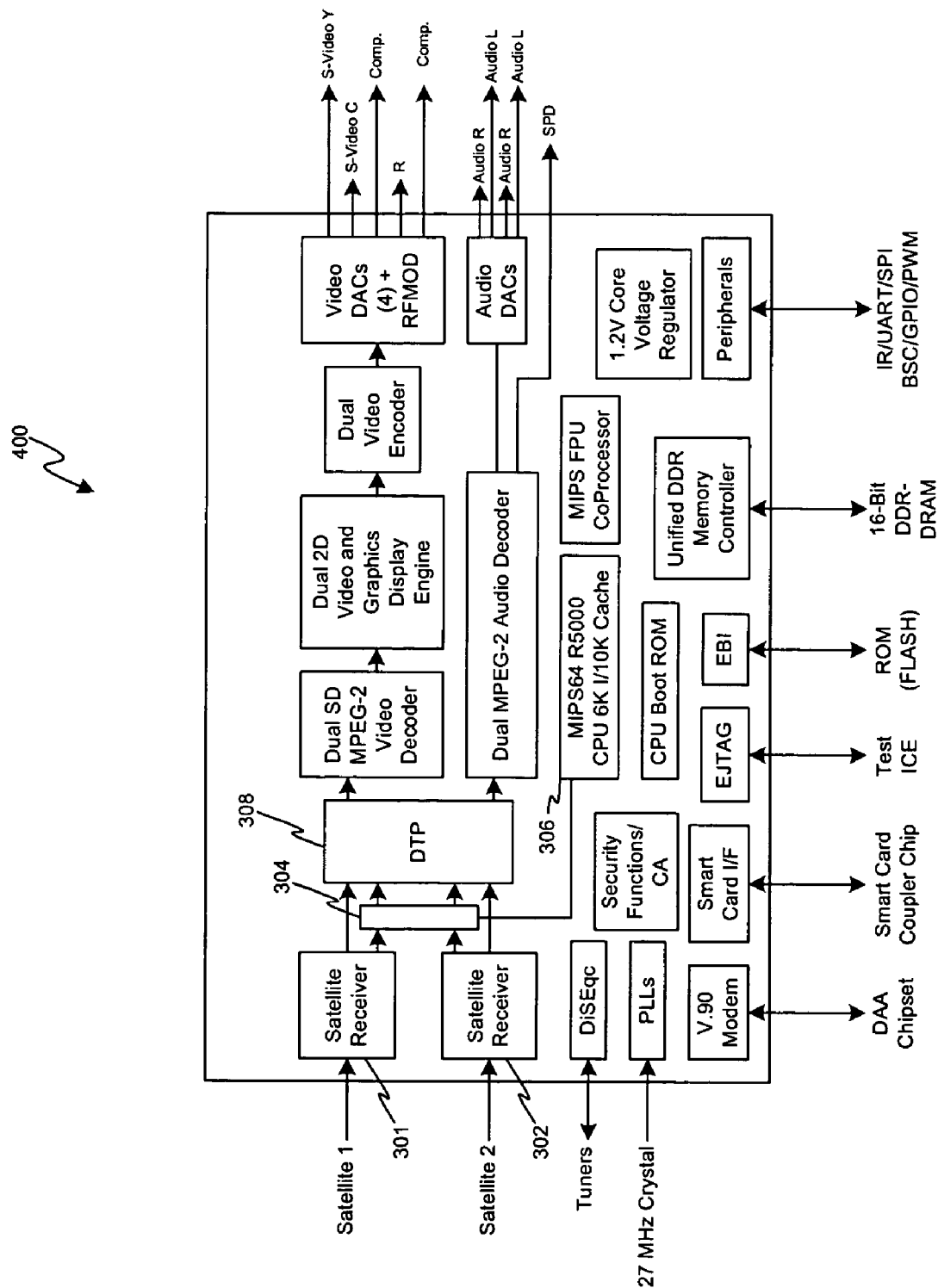
FIG. 4 is a block diagram illustrating a CPU to register interface of the single chip satellite set top box system of FIG. 2 in accordance with an embodiment of the invention.

FIG. 4 is a block diagram 400 illustrating a CPU to register interface of the single chip satellite set top box system of FIG. 2 in accordance with an embodiment of the invention. Referring to FIG. 4, the components are similar to those of FIG. 3. However, there is shown a CPU to register interface 304. On the demodulator side, the CPU to register interface 304 is coupled to the first satellite demodulator/receiver 301 and the second satellite demodulator/receiver 302. The data transport processor (DTP) 308 and the CPU 306 may also be coupled to the CPU to register interface 304.

In current system architectures, each demodulator/receiver processing path must contain its own separate security management or conditional access system. However, the implementation of the single-chip satellite set-top box in accordance with the various embodiments of the invention utilizes a single conditional access system. Since, for example, the integrated demodulators/receivers 301, 302 utilizes the single a CPU to register interface 304, a single conditional access system may be provided to handle processing for each of the channels provided by the integrated demodulators/receivers 301, 302. Accordingly, a single smart card or smartcard chip and one-time programmable ID and memory key may be utilized for security management or conditional access functions.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for an integrated set-top box, the system comprising:
   a single integrated circuit chip comprising:
   a first satellite receiver demodulator integrated within said single integrated circuit chip;
   at least a second satellite receiver demodulator integrated within said single integrated circuit chip;
   at least one processor integrated within said single integrated circuit chip and coupled to said first satellite receiver demodulator and said second satellite receiver demodulator;
   at least one video decoder integrated within said single integrated circuit chip and coupled to said at least one processor;

at least one video and graphics display engine integrated within said single integrated circuit chip and coupled to said at least one video decoder; and at least one video encoder integrated within said single integrated circuit chip and coupled to said at least one video and graphics display engine.

2. The system according to claim 1, comprising at least one video digital-to-analog converter and RF modulator integrated within said single integrated circuit chip and coupled to said at least one video encoder.

3. The system according to claim 1, wherein said at least one video decoder is a standard definition MPEG-2 video decoder.

4. The system according to claim 1, comprising at least one audio decoder integrated within said single integrated circuit chip and coupled to said at least one processor.

5. The system according to claim 4, wherein said at least one audio decoder is an MPEG-2 audio decoder.

6. The system according to claim 4, comprising at least one audio digital-to-analog converter integrated within said single integrated circuit chip and coupled to said at lest one audio decoder.

7. The system according to claim 1, comprising at least one memory controller integrated within said single integrated circuit chip and coupled to at least said at least one processor.

8. The system according to claim 7, wherein said at least one memory controller comprises a unified dual data rate DRAM memory controller.

9. The system according to claim 1, comprising a digital satellite equipment control (DiSEqC) bus integrated within said single integrated circuit chip.

10. The system according to claim 1, comprising one or more of a plurality of peripheral interfaces comprising an infrared interface, a universal asynchronous receiver/transmitter, a serial peripheral interface, a binary synchronous communication interface, general purpose input/output pins, and/or pulse width modulation controller interface, integrated within said single integrated circuit chip.

11. The system according to claim 1, comprising at least one read-only memory integrated within said single integrated circuit chip.

12. The system according to claim 11, wherein said at least one read-only memory comprises a CPU boot ROM and a FLASH.

13. The system according to claim 1, comprising at least one debug port integrated within said single integrated circuit chip.

14. The system according to claim 13, wherein said debug port comprises a JTAG port or any variation thereof.

15. The system according to claim 1, comprising at least one card reader or writer interface integrated within said single integrated circuit chip.

16. The system according to claim 15, wherein said card reader or writer interface is a smart card reader or writer interface.

17. The system according to claim 1, comprising at least one core voltage regulator integrated within said single integrated circuit chip.

18. The system according to claim 1, comprising at least one phase lock loop integrated within said single integrated circuit chip.

19. The system according to claim 1, comprising at least one telephony modem integrated within said single integrated circuit chip.

20. The system according to claim 1, wherein said first satellite receiver demodulator and said second satellite receiver demodulator are one or more of 8 PSK, 8 PSK-turbo and/or QPSK demodulators.

21. A method for processing information in a set-top box, the method comprising:

receiving a first modulated signal by a first satellite receiver within a single integrated circuit chip;

demodulating said first modulated signal by said first satellite receiver within said single integrated circuit chip to generate a first demodulated signal;

receiving a second modulated signal by a second satellite receiver within said single integrated circuit chip;

demodulating said second modulated signal by said second satellite receiver within said single integrated circuit chip to generate a second demodulated signal;

decoding within said single integrated circuit chip, a video portion of said second demodulated signal to generate a second decoded video signal;

encoding within said single integrated circuit chip, said second decoded video signal within said single integrated circuit chip to generate a second encoded digital video signal; and converting within said single integrated circuit chip, said second encoded digital video signal to a second analog video signal.

22. The method according to claim 21, wherein said demodulating of said first modulated signal and said demodulating of said second modulated signal occurs simultaneously.

23. The method according to claim 21, comprising decoding within said single integrated circuit chip, a video portion of said first demodulated signal to generate a first decoded video signal.

24. The method according to claim 23, comprising encoding within said single integrated circuit chip, said first decoded video signal within said single integrated circuit chip to generate a first encoded digital video signal.

25. The method according to claim 24, comprising converting within said single integrated circuit chip, said first encoded digital video signal to a first analog video signal.

26. The method according to claim 21, comprising decoding within said single integrated circuit chip, an audio portion of said first demodulated signal to generate a first decoded digital audio signal.

27. The method according to claim 26, comprising converting within said single integrated circuit chip, said first decoded digital audio signal to a first analog audio signal.

28. A method for processing information in a set-top box, the method comprising:

receiving a first modulated signal by a first satellite receiver within a single integrated circuit chip;

demodulating said first modulated signal by said first satellite receiver within said single integrated circuit chip to generate a first demodulated signal;

receiving a second modulated signal by a second satellite receiver within said single integrated circuit chip;

demodulating said second modulated signal by said second satellite receiver within said single integrated circuit chip to generate a second demodulated signal;

decoding within said single integrated circuit chip, a video portion of said second demodulated signal to generate a second decoded video signal;

decoding within said single integrated circuit chip, an audio portion of said second demodulated signal to generate a second decoded digital audio signal; and converting within said single integrated circuit chip, said second decoded digital audio signal to a second analog audio signal.

29. The method according to claim 28, wherein said demodulating of said first modulated signal and said demodulating of said second modulated signal occurs simultaneously.

30. The method according to claim 28, comprising decoding within said single integrated circuit chip, a video portion of said first demodulated signal to generate a first decoded video signal.

31. The method according to claim 30, comprising encoding within said single integrated circuit chip, said first decoded video signal within said single integrated circuit chip to generate a first encoded digital video signal.

32. The method according to claim 31, comprising converting within said single integrated circuit chip, said first encoded digital video signal to a first analog video signal.

33. The method according to claim 28, comprising decoding within said single integrated circuit chip, an audio portion of said first demodulated signal to generate a first decoded digital audio signal.

34. The method according to claim 33, comprising converting within said single integrated circuit chip, said first decoded digital audio signal to a first analog audio signal.

* * * * *